Sept. 16, 1958 R. O. BILLINGS 2,851,961
VEHICLE TRANSFER DOLLIES
Filed Nov. 10, 1954 2 Sheets-Sheet 1

INVENTOR.
Roy O. Billings,
BY Morsell & Morsell
ATTORNEYS

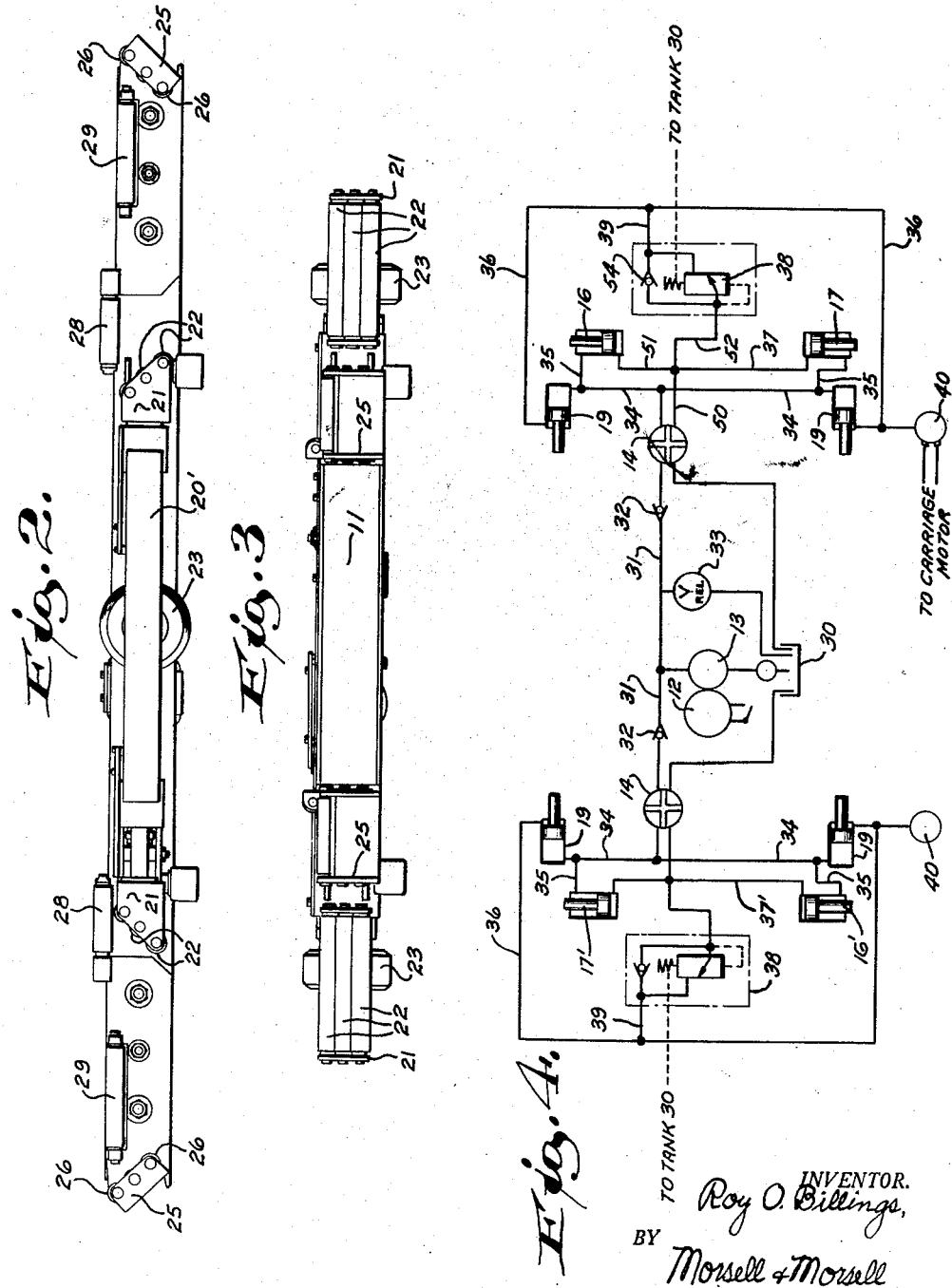

United States Patent Office 2,851,961
Patented Sept. 16, 1958

2,851,961

VEHICLE TRANSFER DOLLIES

Roy O. Billings, Milwaukee, Wis.

Application November 10, 1954, Serial No. 467,961

12 Claims. (Cl. 105—27)

This invention relates to improvements in vehicle transfer dollies, and more particularly to a dolly for use with an automatic multiple automobile parking apparatus.

In my copending application, Serial No. 356,144, filed May 20, 1953, I have disclosed and described certain components of an apparatus for handling automobiles which components include a dolly for automatically moving an automobile from a selected parking stall to a shiftable cage and vice versa, together with a carriage for moving the dolly relative to a cage.

While the dolly disclosed in said prior application, Serial No. 356,144 is generally satisfactory for the purposes indicated, it has certain limitations and the primary object of the present invention is to provide an improved form of vehicle transferring dolly which will accurately and securely contact the front wheels of an automobile to be shifted, and which is adaptable to automobile wheels regardless of the wheel or tire sizes and regardless of the transverse dimension between the vehicle wheels.

A further object of the invention is to provide a vehicle transfer dolly which will automatically "feel" the specific tread width and tire size of a vehicle to be engaged and which will adjust thereto so as to closely hug surface portions of the vehicle tires to prevent eccentric movements of the automobile while being shifted and to insure traction within the cage.

A further object of the invention is to provide a vehicle transfer dolly in which the adjustable and compensatable vehicle tire engaging members are automatically hydraulically operated in a very expeditious manner.

A further object of the invention is to provide a transfer dolly which is relatively simple in construction and operation, which is strong and durable, which cooperates with other components of an automatic parking apparatus, and which is well adapted for the purposes described.

With the above and other objects in view, the invention consists of the improved vehicle transfer dolly and its parts and combinations as set forth in the claims, and all equivalents thereof.

In the accompanying drawings in which the same reference characters indicate the same parts in all of the views:

Fig. 2 is a side view of the vehicle transfer dolly;

Fig. 3 is an end view of the dolly; and

Fig. 4 is a schematic view showing the hydraulic circuit for reciprocating and adjusting the vehicle wheel engaging rollers on the dolly.

Figure 1:
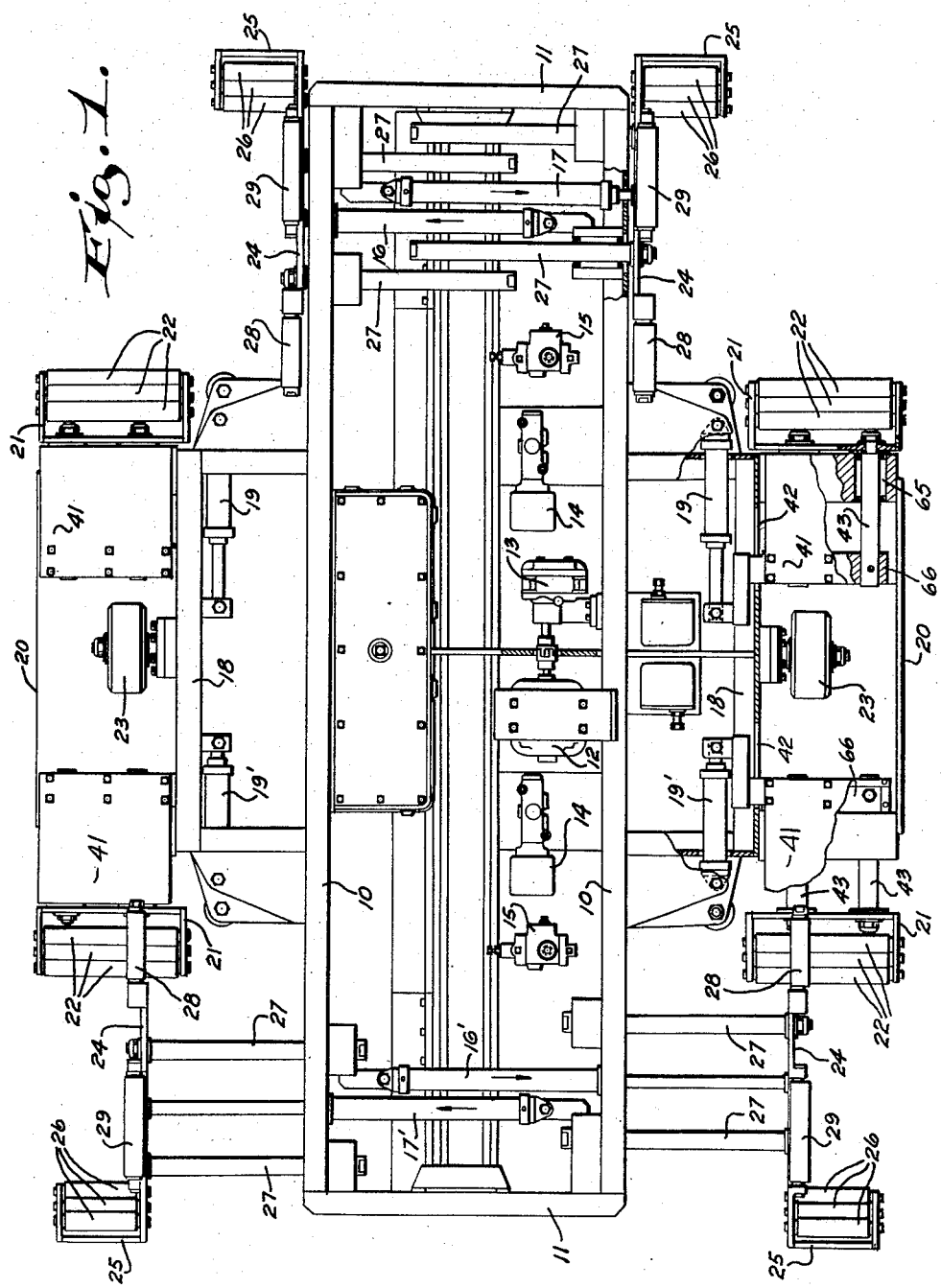
Fig. 1 is a top plan view of the dolly with parts broken away and in section to show structural details.

As will best appear from Fig. 1, the midportion of the dolly which provides a support for various associated elements and other moving parts includes a rectangular metallic framework composed of spaced-apart longitudinal frame members 10 and transverse end frame members 11. Said intermediate framework provides a support for various elements of the electrical and hydraulic system, including an electric motor 12 operatively connected with an hydraulic pump 13, oppositely disposed four-way valves 14 and sequence valves 15, all of which will be referred to more fully hereinafter in connection with the hydraulic diagram in Fig. 4.

Also at opposite outer end portions of the intermediate framework are transversely mounted pairs of oppositely directed hydraulic rams 16, 17, and 16' and 17' respectively.

Rigidly mounted on opposite sides of the longitudinal members 10 of the intermediate framework to project laterally outwardly therefrom are frames 18 which support roller frame longitudinally adjusting hydraulic rams 19 and 19'. Supported by the frames 18 so as to project laterally outwardly therefrom are open box structures 20 which longitudinally adjustably support at their outer ends roller carrying brackets 21 in each of which a series of rollers 22 are freely revolubly journalled in downwardly outwardly stepped relationship, which rollers are adapted to be adjustably contacted with the forwardly facing peripheral portions of the front tires of the vehicle. Said box structures 20 and 20' also provide enclosures for wheels 23 on which the dolly is adapted to ride. Projecting inwardly from each roller carrying bracket 21 are rods 43 which are slidable in guideways 65 in the ends of the box structure 20. The inner ends of the rods are secured to slides 66 and each of the latter has an end projecting laterally through a slot 42 in the inner side of the box structure and connected to the extensible piston of the adjacent ram 19 or 19'. Each of the cylinders of the rams 19 or 19' is rigidly connected to the frame. A cover plate 41 is fixed to each slide 66 to move therewith.

It will be observed that the transversely mounted hydraulic rams 16—17 and 16'—17', in pairs at the opposite ends of the intermediate frame, have their pistons extended through the adjacent longitudinal frame members 10 so as to be projectable in a lateral direction for inward and outward adjustment. There are also end frames 24, which carry at their outer ends roller brackets 25 facing the roller brackets 21, and which have journalled therein rollers 26 for engagement with rear peripheral portions of the front tires, the rollers in each bracket 25 being in inwardly downwardly stepped relationship.

In addition to the pistons of the hydraulic rams 16 and 16' and 17 and 17' which engage the frames 24 to project the same, the longitudinal frame members 10 have rods 27 mounted therein for extension and support of the frames 24. At this point it may be stated that at the right hand end of Fig. 1 the pistons of the hydraulic rams and the guide rods 27 are in their retracted positions wherein the frames carrying the rollers 26 are retracted against the frame members 10. Conversely, at the left hand end of the intermediate frame in Fig. 1 the hydraulic rams 16' and 17' have their pistons projected, as are the guide rods 27, said portion of Fig. 1 also showing the position of the rollers 26 in longitudinal alinement with the rollers 22 for tire engaging purposes.

In this position the rollers 26 will frictionally engage the rear peripheral portions of the front tires of a vehicle which is accomplished after the dolly has been correctly positioned relative to the vehicle for which there must first be a retraction of the elements which operate the rollers 26, as at the right-hand end of Fig. 1.

The laterally projectable frames 24 each carry pairs of rollers 28 and 29. The rollers 28 and 29 of each pair are at different elevations, as shown in Fig. 2 and extend longitudinally of the dolly, the rollers 28 being adapted for engagement with the inner side of the front wheels near the front, and the rollers 29 being adapted for engagement with the inner sides of the front wheels farther rearwardly. In operation, said rollers 28 and 29 are adaptable to various tread widths and are freely rotatable and are adapted to hug inner face portions of the tires of the vehicle being transferred by the dolly and roll when the wheels turn during movement of the vehicle by the dolly.

In Fig. 4 of the drawing there is disclosed the hydraulic system for operating the various rams to thereby adjust the dolly rollers to various tread widths and to various tire sizes. The numeral 30 designates the oil or hydraulic fluid reservoir, and when the electric motor 12 is in operation the pump 13 circulates the oil which is adapted to flow outwardly in both directions through a fluid conduit 31 in which there are check valves 32 and a relief valve 33. In the oppositely directed extents of the conduit 31, beyond the check valves 32 there are the four-way control valves 14 previously referred to.

Assuming that it is desired to operate the rams on the right hand side of Fig. 1, then the four-way control valve on the right side of Fig. 4 is set, either manually or otherwise, to direct the flow from line 31 into line 50 and from line 50 through lines 51 and 37 into the rams 16 and 17 to project both rams simultaneously and cause outward lateral movement of the rollers 28 and 29 on both sides of the right hand end of the dolly. At the same time the rollers 26 are also being moved laterally outwardly with the frames 24. Fluid which is being exhausted from the cylinders for the rams 16 and 17 flows out through the lines 35 and 34 back through the four-way valve 14 and back into the tank 30.

It is very important that the rollers 28 and 29 properly contact the inner sides of the wheels and that the rollers 26 be properly positioned with respect to the wheels before the rollers 22 are moved into engagement. Otherwise, if the rollers 26 were not in proper position in front of the tires, movement of the rollers 22 could push the car out of position.

After the rollers 28 and 29 properly engage the inner sides of the tires, pressure starts to build up in the lines 51, 37 and 52. When this pressure reaches a predetermined amount such as 200 pounds per square inch, it actuates a pressure sequence valve 38 which then lets the fluid flow from 52 through line 39, and through and in both directions through line 36 into the cylinders for the rams 19 to retract the piston rods of said rams. This acts through the slides 66 and rods 43 to push the sets of rollers 22 into engagement with the front peripheral portions of the vehicle front wheels so that the wheels are properly engaged between the sets of rollers 26 and 22. Fluid exhausted from the cylinders for the rams 19 goes out through the lines 34 through the four-way valve 14 back into the tank 30. After the rollers 22 have properly engaged the tires, and after the pressure in the lines 36 reaches a predetermined value, then the electric pressure switch 40 is operated automatically to start the carriage motor (not shown) for pulling the dolly and car as is fully described in copending application, Serial No. 356,144.

After the car has been moved and it is desired to free the wheels, then the four-way valve 14 is turned to a different position to cause retraction of the various rollers. During this operation the fluid is flowing from the valve 14 through the lines 34, and fluid is being exhausted from the cylinders 19 through the lines 36 and 39, past the check valve 54 and back into the tank 30. At substantially the same time, fluid is flowing through the lines 35 to retract the rams in the cylinders 16 and 17 and cause retraction of the rollers 28, 29 and 26. The fluid exhausted from the cylinders 16 and 17 flows back to the tank through lines 37, 51 and 50, by way of the valve 14.

When it is desired to operate the rams on the left hand side of Fig. 1, then the four-way valve 14 on the right hand side of Fig. 4 is turned to a shut-off position, and the valve 14 on the left hand side of Fig. 4 is operated. The sequences heretofore described take place on the left hand side just the same as recited in connection with the right hand side.

In certain cases where space is at a premium, and where there are stalls on one side of the elevator shaft only, then the mechanism on one side of the dolly of Fig. 1 may be omitted as well as the corresponding devices shown on the same side of Fig. 4.

In order to understand the manner in which the improved dolly operates, let it be assumed that the elevator cage is in registration with a certain stall to the right thereof in which an automobile to be removed is parked, and let it further be assumed that the dolly carriage and dolly operated thereby are both in the cage in condition to have the dolly projected toward the registering right hand stall. For this purpose, through the carriage motor (not shown) the carriage which propels the dolly of Fig. 1 is caused to move the cage a certain distance as explained in my copending application No. 356,144, thereby projecting the right hand end of the dolly (referring to Fig. 1) toward the front end of an automobile parked in a stall. At such time all of the roller operating rams on the dolly are fully retracted. Then, by the operations of the rams 16, 17 and 19 as heretofore described, the rollers 22 and 26 are brought into registration and contact with opposite peripheral portions of the forward tires of the automobile and the rollers 28 and 29 into engagement with the inner side walls of said tires. The vehicle tires are, therefore, perfectly engaged by the devices on the dolly in a manner to permit the rolling of the wheels when the dolly is propelled, to move the vehicle to or from a stall relative to the elevator cage. The various rollers automatically adjust to the wheels regardless of the wheel or tire sizes, and regardless of the transverse dimension between the vehicle wheels. Consequently, when the automobile is shifted by the dolly, traction is assured and weaving or eccentric movements of the automobile is prevented.

Through reverse operations, the rollers can be caused to disengage the vehicle tires, and when in the disengaged position, as shown at the right hand end in Fig. 1 of the drawings, the dolly may be withdrawn from the vehicle.

The improved vehicle transfer dolly is adaptable to automobiles of various types having various tread widths and tire sizes; is automatic and rapid in its operation; and is well adapted for the purposes described.

What is claimed as the invention is:

1. A transfer dolly for wheeled vehicles comprising a portable frame, a wheel engaging unit movably supported on a side of said frame for lateral projectable movement toward a face of a wheel of a vehicle to be transferred, said unit having a wheel-periphery engaging member projecting therefrom, means for causing lateral projectable movement of said unit to bring said wheel-periphery engaging member into overlapping relationship with respect to a peripheral portion of a vehicle wheel, another wheel engaging unit movably mounted on the frame in spaced position from said first unit for projectable movement in a direction at right angles to the direction of movement of said first unit and having a wheel-periphery engaging member, and means for moving the wheel-periphery engaging member of said last unit toward the projected wheel-periphery engaging member of the first unit to cause a vehicle wheel to be engaged therebetween.

2. A transfer dolly for wheeled vehicles comprising a portable frame having an end portion of a width to be straddled by a pair of wheels of a vehicle to be transferred, a wheel engaging unit movably supported on each side of said end portion of the dolly for laterally outward projectable movement and each having a wheel-periphery engaging member, means for causing laterally outward projectable movement of said units to bring said wheel-periphery engaging members into overlapping relationship with respect to peripheral portions of said wheels, and other wheel engaging units movably mounted on the frame in spaced position from said first units for projectable movement in a direction at right angles to the direction of movement of said first units and having wheel-periphery engaging members, and means for moving the wheel-periphery engaging members of said last-mentioned units toward the projected wheel-periphery engaging members of the first units to cause vehicle wheels to be engaged therebetween.

3. A transfer dolly for wheeled vehicles comprising a portable frame having an end portion of a width to be straddeld by a pair of wheels of a vehicle to be transferred, a wheel engaging unit movably supported on each side of said end portion of the dolly for laterally outward projectable movement each having anti-friction members and each having a wheel-periphery engaging member disposed at right angles to said anti-friction members, means for causing laterally outward projectable movement of said units to bring said anti-friction members into engagement with inner faces of said wheels with the wheel-periphery engaging members offset longitudinally of the vehicle from peripheral portions of said wheels and adjacent thereto, other wheel engaging units movably mounted on the frame in spaced position from said first units for projectable movement in a direction at right angles to the direction of movement of said first units and having wheel-periphery engaging members, and means for moving the wheel-periphery engaging members of said last units toward the wheel-periphery engaging members of said first units to embrace vehicle wheels therebetween.

4. A transfer dolly for wheeled vehicles comprising a portable frame, a wheel engaging unit movably supported on a side of said frame for lateral projectable movement toward a face of a wheel of a vehicle to be transferred, said unit having a wheel-periphery engaging roller projecting therefrom whose axis extends in the direction of projectable movement of the wheel engaging unit, means for causing lateral projectable movement of said wheel engaging unit to bring said roller into overlapping relationship with respect to the periphery of a wheel, another wheel engaging unit movably mounted on the frame in spaced position from said first unit for projectable movement in a direction at right angles to the direction of movement of the first unit and having a wheel-periphery engaging roller, and means for moving the wheel-periphery engaging roller of said last unit toward the roller of said first unit to embrace a vehicle wheel therebetween.

5. A transfer dolly for wheeled vehicles comprising a portable frame, a first wheel engaging unit movably supported on a side of said frame for lateral projectable movement toward a face of a wheel of a vehicle to be transferred, said unit having a wheel-periphery engaging roller projecting therefrom whose axis extends in the direction of projectable movement of the wheel engaging unit, means for moving said unit to bring said roller into overlapping relationship with respect to the periphery of a wheel, a second wheel engaging unit movably mounted on the frame in spaced position from said first unit for projectable movement in a direction at right angles to the direction of movement of the first unit and having a wheel-periphery engaging roller, means for causing projectable movement of said wheel-periphery engaging roller of the second unit toward the wheel-periphery engaging roller of the first unit to embrace a vehicle wheel therebetween, and means responsive to completion of projectable movement of the first wheel engaging unit for initiating movement of said second wheel engaging unit.

6. A transfer dolly for wheeled vehicles comprising a portable frame having an end portion of a width to be straddled by a pair of wheels of a vehicle to be transferred, a first wheel engaging unit movably supported on each side of said frame for lateral projectable movement toward inner faces of said wheels, each of said first units having a wheel-periphery engaging roller projecting therefrom whose axis extends in the direction of projectable movement of the wheel engaging unit, a second wheel engaging unit movably mounted on each side of the frame in spaced position from said first units for projectable movement in a direction at right angles to the direction of movement of the first units and each having a wheel-periphery engaging roller, means for causing lateral movement of said first wheel engaging units to bring the wheel-periphery engaging rollers thereof into overlapping relationship with respect to vehicle wheels, means for causing projectable movement of the wheel-periphery engaging rollers of the second units toward said rollers of the first units to embrace vehicle wheels therebetween, and means responsive to completion of projectable movement of the first wheel engaging units for initiating movement of the second wheel engaging units.

7. A transfer dolly for wheeled vehicles comprising a portable frame, a first wheel engaging unit movably supported on a side of said frame for lateral projectable movement toward a face of a wheel of a vehicle to be transferred, anti-friction members on said unit, said unit also having a wheel-periphery engaging roller whose axis extends in the direction of projectable movement of the unit, means for causing lateral projectable movement of said first unit to bring said anti-friction members into engagement with the face of a wheel and to bring said wheel-periphery engaging roller into overlapping relationship with respect to the periphery of said wheel, a second wheel engaging unit movably mounted on the frame in spaced position from said first unit for projectable movement in a direction at right angles to the direction of movement of said first unit and having a wheel-periphery engaging roller, and means for moving said wheel-periphery engaging roller of said last-mentioned unit toward the wheel-periphery engaging roller of the first unit to embrace a vehicle wheel therebetween.

8. A transfer dolly for wheeled vehicles comprising a portable frame, a first wheel engaging unit movably supported on a side of said frame for lateral projectable movement toward a face of a wheel of a vehicle to be transferred, anti-friction members on said unit, and a wheel-periphery engaging roller on said unit whose axis extends in the direction of projectable movement of the unit, means for causing lateral projectable movement of said unit to bring said anti-friction members into engagement with said face of the wheel and to bring said wheel-periphery engaging roller into overlapping relationship with respect to the periphery of said wheel, a second wheel engaging unit movably mounted on the frame in spaced position from said first unit for projectable movement in a direction at right angles to the direction of movement of said first unit and having a wheel-periphery engaging roller, means for causing projectable movement of the second wheel engaging unit to move its roller toward the wheel-periphery engaging roller of the first unit to embrace a wheel therebetween, and means responsive to contact of the anti-friction members of the first wheel engaging unit with the face of the wheel for initiating operation of the second wheel engaging unit.

9. A transfer dolly for wheeled vehicles comprising a portable frame, a first wheel engaging unit movably supported on a side of said frame for lateral projectable movement toward a face of a wheel of a vehicle to be transferred, anti-friction members on said unit, and a wheel-periphery engaging roller on said unit whose axis extends in the direction of projectable movement of the unit, fluid pressure operated means for causing projectable movement of said unit to bring the anti-friction members into engagement with the face of said wheel and to bring the wheel-periphery engaging roller into overlapping relationship with the periphery of said wheel, a second wheel engaging unit movably mounted on the frame in spaced position from said first unit for projectable movement in a direction at right angles to the direction of said first unit and having a wheel-periphery engaging roller, fluid pressure operated means for causing projectable movement of the second wheel engaging unit to move its wheel-periphery engaging roller toward the wheel-periphery engaging roller of the first unit to embrace a wheel therebetween, and a common fluid circuit including a source of fluid under pressure for said two fluid pressure operated means, said circuit including mechanism responsive to engagement of the anti-friction members of the first wheel engaging unit with the face of a wheel for transferring fluid under pressure from said first fluid pressure operated means to said second fluid pressure operated means.

10. A transfer dolly for wheeled vehicles comprising a portable frame, first wheel engaging units movably supported on opposite sides of said frame for lateral projectable movement toward faces of wheels of a vehicle to be transferred, anti-friction members on said units, a wheel-periphery engaging roller on each unit whose axis extends in the direction of projectable movement of the unit, fluid pressure operated means for causing projectable movement of said first units to bring the anti-friction members into engagement with the faces of wheels and to bring the wheel-periphery engaging rollers into overlapping relationship with peripheral portions of said wheels, second wheel engaging units movably mounted on opposite sides of the frame in spaced position from said first units for projectable movement in a direction at right angles to the direction of movement of said first units and each having a wheel-periphery engaging roller, fluid pressure operated means for causing projectable movement of the second wheel engaging units to move their wheel-periphery engaging rollers toward the wheel-periphery engaging rollers of the first units and embrace wheels therebetween, and a common fluid circuit including a source of fluid under pressure for said two fluid pressure operated means, said circuit including mechanism responsive to engagement of the anti-friction members of the first wheel-engaging units with the faces of the wheels for transferring fluid under pressure from said first fluid pressure operated means to said second fluid pressure operated means.

11. A transfer dolly for wheeled vehicles comprising a portable frame, a wheel engaging unit movably supported on a side of said frame for lateral projectable movement toward a face of a wheel of a vehicle to be transferred, said unit having a wheel-periphery engaging member projecting therefrom, means for causing lateral projectable movement of said unit to bring said wheel-periphery engaging member into overlapping relationship with respect to a peripheral portion of a vehicle wheel, another wheel engaging unit mounted on the frame and having a wheel-periphery engaging member which is in alignment with and spaced from the wheel-periphery engaging member of the first unit after said first unit has been projected whereby a vehicle wheel may be embraced between said two wheel-periphery engaging members, and means for causing relative movement of said two wheel-periphery engaging members toward each other to fit a particular wheel size.

12. A transfer dolly for wheeled vehicles comprising a portable frame, a wheel engaging unit movably supported on a side of said frame for lateral projectable movement toward a face of a wheel of a vehicle to be transferred and having anti-friction means engageable with said face, said unit having a wheel-periphery engaging member projecting therefrom, means for causing lateral projectable movement of said unit to bring said anti-friction means into engagement with the face of a wheel and to bring said wheel-periphery engaging member into overlapping relationship with respect to a peripheral portion of said wheel, another wheel engaging unit mounted on the frame and having a wheel-periphery engaging member which is in alignment with and spaced from the wheel-periphery engaging member of the first unit after said first unit has been projected whereby a vehicle wheel is embraced between said two wheel-periphery engaging members, and means for causing relative movement of said two wheel-periphery engaging members toward each other to fit a particular wheel size.

References Cited in the file of this patent

UNITED STATES PATENTS

| 1,803,583 | Aitken | May 5, 1931 |
| 1,864,711 | Buetell | June 28, 1932 |
| 1,885,213 | Aitken | Nov. 1, 1932 |
| 2,016,662 | Aitken | Oct. 8, 1935 |
| 2,117,274 | Buetell | May 17, 1938 |